United States Patent
Tolzman et al.

(10) Patent No.: US 10,518,439 B2
(45) Date of Patent: Dec. 31, 2019

(54) CURVED SLAB SURFACES, SYSTEMS, AND METHODS

(71) Applicant: Cambria Company LLC, Eden Prairie, MN (US)

(72) Inventors: Craig Tolzman, St Peter, MN (US); Brian R. Scoggin, Prior Lake, MN (US); Jon Louis Grzeskowiak, II, Prior Lake, MN (US); Martin E. Davis, Excelsior, MN (US)

(73) Assignee: Cambria Company LLC, Eden Prairie, MN (US)

(*) Notice: Subject to any disclaimer, the term of this patent is extended or adjusted under 35 U.S.C. 154(b) by 277 days.

(21) Appl. No.: 15/714,827

(22) Filed: Sep. 25, 2017

(65) Prior Publication Data
US 2019/0091889 A1   Mar. 28, 2019

(51) Int. Cl.
| | | |
|---|---|---|
| *B29C 51/00* | (2006.01) | |
| *B28B 19/00* | (2006.01) | |
| *B28B 11/00* | (2006.01) | |
| *B28B 1/00* | (2006.01) | |
| *B29C 67/24* | (2006.01) | |
| *C04B 111/54* | (2006.01) | |

(52) U.S. Cl.
CPC .......... *B28B 19/0076* (2013.01); *B28B 1/004* (2013.01); *B28B 11/005* (2013.01); *B29C 67/242* (2013.01); *B28B 1/005* (2013.01); *C04B 2111/545* (2013.01)

(58) Field of Classification Search
None
See application file for complete search history.

(56) References Cited

U.S. PATENT DOCUMENTS

| | | | | |
|---|---|---|---|---|
| 5,236,658 A | * | 8/1993 | Ford | B29C 51/082 264/299 |
| 5,521,243 A | * | 5/1996 | Minghetti | C04B 26/06 524/437 |
| 6,110,313 A | * | 8/2000 | Ford | B29C 51/082 156/212 |
| 2006/0105595 A1 | * | 5/2006 | Provence | B29C 53/04 439/74 |

FOREIGN PATENT DOCUMENTS

| | | |
|---|---|---|
| CA | 2251918 | 8/1998 |
| CN | 105666760 | 6/2016 |
| NL | 1001066 C1 * | 2/1996 |
| WO | WO-01/83199 A1 * | 11/2001 |

OTHER PUBLICATIONS

'4willis.com' [online] "DuPont Corian Solid Surface Fabrication/Installation FundamentalsThermoforming," copyright 2012 [retrieved on Mar. 30, 2017] Retrieved from Internet: URL<http://4willis.com/pdf/corian/fabrication/Chapter15 K-25297 Thermoforming.pdf> 8 pages.

(Continued)

*Primary Examiner* — Jeffry H Aftergut
(74) *Attorney, Agent, or Firm* — Fish & Richardson P.C.

(57) ABSTRACT

Systems and methods of thermoforming stone slabs are provided, such as by heating a stone slab while forming it to a mold. Curved stone slabs may be produced having low radii of curvature.

20 Claims, 6 Drawing Sheets

(56) References Cited

OTHER PUBLICATIONS

'forum.stonefabricatorsalliance.com' [online] "Bending quartz," posted Oct. 6, 2015, [retrieved on Mar. 30, 2017] Retrieved from Internet: URL<https://forum.stonefabricatorsalliance.com/viewtopic.php?t=20896> 5 pages.

'solidsurface.com' [online] "How to Thermoform Solid Surface," copyright 2017, SurfaceNet, LLC. [retrieved on Mar. 30, 2017] Retrieved from Internet: URL<http://solidsurface.com/thermoforming> 3 pages.

'www.stewkleystone.com' [online] "Quartz Thermoforming," posted on Nov. 5, 2014, [retrieved on Mar. 30, 2017] Retrieved from Internet: URL<http://www.stewkleystone.com/project/quartz-thermoforming/> 2 pages.

'www.stonespecialist.com' [online] "3D textured surface launched in Hi-Macs," posted on Mar. 2, 2017, [retrieved on Mar. 30, 2017] Retrieved from Internet: URL<https://www.stonespecialist.com/news/company-news/3d-textured-surface-launched-hi-macs> 6 pages.

'www.thefabricatornetwork.com' [online] "Richlite—Can it be bent?", posted Mar. 1, 2010 [retrieved on Mar. 30, 2017] Retrieved from Internet: URL<http://www.thefabricatornetwork.com/Forum/tabid/164/aft/258564/Default.aspx> 5 pages.

'www.youtube.com' [online] "Caesarstone University: Two Methods of Thermoforming," published on Oct. 24, 2014, [retrieved on Mar. 30, 2017] Retrieved from Internet: URL<https://www.youtube.com/watch?v=je3-CSw_W5c&app=desktop> 2 pages [Video submission].

'youtube.com' [online] "Thermoforming process of acrylic solid surface materials," published Jun. 28, 2012, [retrieved on Mar. 30, 2017] Retrieved from Internet: URL<https://www.youtube.com/watch?v=_8YOrAy5G1Y&feature=youtu.be> 2 pages [Video submission].

\* cited by examiner

CURVED SLAB SURFACES, SYSTEMS, AND METHODS

TECHNICAL FIELD

This document describes slabs having curved surfaces, and systems and processes for manufacturing slabs having curved surfaces.

BACKGROUND

Stone slabs are a commonly used building material. Granite, marble, soapstone, and other quarried stones are often selected for use as countertops, tables, and floors. Stone slabs may be formed from a combination of materials that can provide improved aesthetic characteristics, strength, and stain-resistant or heat resistant properties.

The properties of stone make it a suitable candidate for other applications, including wall panels, shower and bath surrounds, table and counter top bases, sinks, reception area installments, and decorative installments. Quarried and processed stone slabs are typically cut to a desired size and shape prior to installation. Unlike granite and other quarried stone slabs, processed stone slabs are generally formed from a mix including particulate mineral material and a binder, which is then vibro-compacted and heated or otherwise cured to provide a slab. Such molding methods for processed stone slabs typically result in a rectangular slab with substantially flat major surfaces.

SUMMARY

Some embodiments described herein include curved slabs, and systems and processes for forming curved slabs, for use in living or working spaces (e.g., along a countertop, table, floor, wall, or the like). In some embodiments, the slabs are processed slabs formed from a combination of materials, such as particulate mineral material and a binder (e.g., a polymer resin, cement, etc.). In some embodiments, a combination of materials optionally includes quartz, one or more pigments, and one or more resin binders.

Some exemplary systems and processes described herein may include applying conductive heat simultaneously to first and second major surfaces of a slab comprising particulate material, and forming the slab to a mold while applying the conductive heat to the first and second major surfaces. A slab may be formed having a selected curvature suitable for a particular installation, with reduced processing time and/or manual labor.

In one aspect, a method is provided herein for thermoforming a slab. The method includes applying conductive heat simultaneously to a first major surface and a second major surface of a slab comprising particulate material and forming the slab to a mold while applying the conductive heat to the first and second major surfaces. The first major surface of the slab can be separated from the second major surface by a slab thickness. Optionally, the mold comprises a curved molding surface, and the step of forming the slab to the mold comprises applying the conductive heat to the first and second major surfaces of the slab while at least one of the major surfaces is urged toward the curved molding surface of the mold.

In some implementations, the method can optionally include one or more of the following features. Applying heat can include heating a first conductive pad positioned on the first major surface of the slab. Applying heat may further include heating a second conductive pad positioned on the second major surface of the slab. In some implementations, the step of forming the slab can include forming a curve having a radius of curvature of less than 100 inches. In some implementations, the step of forming the slab can include forming a curve having a radius of curvature of 18 inches or greater. In some implementations, the step of forming the slab can include forming a curve having a radius of curvature of between 23 inches and 80 inches. The radius of curvature can be a minimum radius of curvature. The slab can comprise a particulate material, one or more pigments, and one or more resin binders. The particulate material can comprise predominantly quartz. The slab can have a first major surface and a second major surface separated by a thickness, and the thickness can be between 0.001 inches and 3 inches. In some implementations, the thickness of the slab can be between 0.003 inches and 2 inches. Applying conductive heat can include applying heat at a slab moldable temperature, the slab at least partially malleable when heated to the slab moldable temperature. In some implementations, applying conductive heat can include applying conductive heat at a temperature between 50° C. to about 150° C. The slab can comprise a binder material having a glass transition temperature (Tg). Applying conductive heat optionally can include applying heat at a temperature within 20° C. of the glass transition temperature (Tg).

In some implementations, the method can optionally further include securing the slab to the mold for a first period of time. In some implementations, the method can optionally further include manufacturing the slab by compacting, compressing, and at least partially curing the slab prior to applying conductive heat to the slab. In some implementations, the method can optionally further include clamping the slab in a first curved configuration for a first period of time while heat is simultaneously applied to the first and second major surfaces to form a first curve having a first radius of curvature; and clamping the slab in a second curved configuration for a second period of time while heat is simultaneously applied to the first and second major surfaces to form a second curve having a second radius of curvature.

In another aspect, a method is provided herein for thermoforming a slab, including applying conductive heat simultaneously to a first major surface and a second major surface of a slab comprising particulate material, the first major surface separated from the second major surface by a slab thickness; and forming the slab to a mold while applying the conductive heat to the first and second major surfaces by heating a first conductive pad positioned on the first major surface of the slab and heating a second conductive pad positioned on the second major surface of the slab; wherein the resulting slab includes a curve having a minimum radius of curvature between 18 inches and 100 inches. The slab can optionally comprise a particulate material, one or more pigments, and one or more resin binders, and applying conductive heat comprises applying heat at a temperature within 20° C. of the glass transition temperature (Tg) of the one or more resin binders.

In another aspect, a method is provided herein for thermoforming a slab, including forming the slab to a curved surface of a mold while applying the conductive heat to first and second major surfaces of the slab.

In another aspect, a processed slab having a curved shape is provided. The processed slab can comprise a first major surface separated from an opposing second major surface by a slab thickness; a mix of particulate mineral material; one or more pigments; and one or more resin binders, wherein both the first major surface and second major surface are conductively heated and are curved and parallel to one another. Optionally, at least one of the first major surface and second major surface of the processed slab has a radius of curvature of less than 100 inches, less than 80 inches, less than 60 inches, or less than 30 inches. The processed slab can be at least partially malleable. Optionally, the temperature of the processed slab is a slab moldable temperature. The one or more binders can have a glass transition temperature (Tg) and the slab moldable temperature can optionally be within 20° C. of the glass transition temperature (Tg).

The slabs, systems and methods described herein can provide several advantages. First, thermoforming slabs by applying conductive heat to multiple surfaces (e.g., top and bottom major surfaces) facilitates substantially consistent heating of the slab through the entire thickness of the slab. Conductive heat provides controlled and efficient heat transfer such that the slab may be heated to a temperature suitable for molding based on characteristics of a polymer binder or other components within the slab.

Second, various curved slabs, systems and methods described herein can provide tighter curves (e.g., with a smaller radius of curvature) in less time and/or with less manual labor/intervention. For example, application of conductive heat sources simultaneously to top and bottom major surfaces can improve consistency of a slab temperature throughout a thickness of the slab, which in turn may facilitate molding of the slab without substantial cracks, blemishes, etc. Curved slabs may thus have a combination of larger slab thickness, larger particulate sizes and/or smaller radii of curvature while providing a pleasing aesthetic appearance.

Third, pre-manufactured slabs may increase manufacturing efficiency by requiring fewer mold types, shapes, etc. in vibration and compaction operations that may be used during initial manufacturing of the slabs. For example, a single mold (e.g., having a standard or common mold shape) may be used for fabrication of slabs from raw materials, while one or more thermoforming methods described herein may be used to customize the slabs into curved slabs having multiple different three dimensional curves and shapes.

Fourth, the methods and systems described herein facilitate forming slabs to a range of shapes and curvatures while requiring less time and resources. For example, a heating device (e.g., a conductive heating pad) may readily be positioned to apply heat to a slab during a molding operation and subsequently removed without generating substantial waste materials.

Fifth, the methods and systems described herein may facilitate automation or semi-automated methods. For example, a slab may be loaded into a system which carries out one or more operations with limited manual intervention to impart a curved surface to the slab.

Sixth, the methods and systems described herein facilitate thermoforming at a manufacturing location or a remote location such as a fabrication location or an installation location. Substantially planar slabs may be readily transported to a fabrication or installation location (e.g., such that many slabs may be efficiently transported in a relatively small volume), and subsequently formed to impart a desired curve.

The details of one or more implementations are set forth in the accompanying drawings and the description below. Other features and advantages will be apparent from the description and drawings, and from the claims.

DETAILED DESCRIPTION

Figure 1:
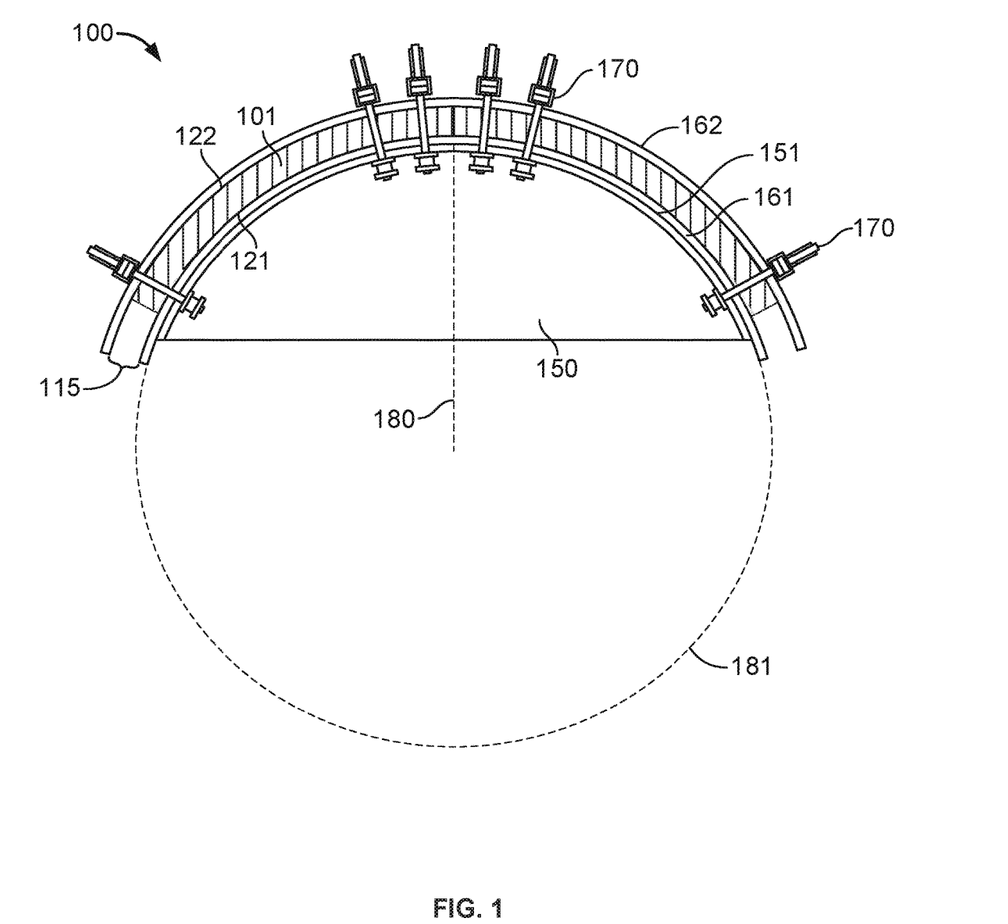
FIG. 1 is a plan view of an exemplary system for thermoforming a curved slab having a single semi-circular curve.

Referring to FIG. 1, an exemplary system 100 that may be used to form a curved slab (e.g., bent, arced, angled, undulating, arcuate, or otherwise non-planar surfaces) is shown. System 100 includes a mold 150 and a heating device, such as heating devices 161, 162, configured to generate heat for application to a slab. Mold 150 includes a surface having a shape that can be imparted to the slab by positioning the slab on the surface of the mold 150 and applying heat to the slab from the heating device. For example, mold 150 includes a curved surface 151 (e.g., having a semi-circular curve) that a slab may be conformed to.

Slab 101 (e.g., an uncut slab or a portion of a slab) is located at least partially on mold 150 such that a curvature of mold 150 may be imparted to slab 101. In an exemplary embodiment, slab 101 has a first major surface 121, a second major surface 122, and a thickness 115 separating the first major surface 121 and the second major surface 122. In an exemplary embodiment, slab 101 is supported entirely on mold 150. Alternatively or additionally, slab 101 may be supported by one or more support devices (e.g., while mold 150 functions primarily to provide a shaped surface).

The heating device of system 100 is configured to warm slab 101 to a moldable temperature sufficient to facilitate deformation and/or molding of slab 101 to the outer curvature of mold 150. In an exemplary embodiment, the heating device includes one or more conductive heating devices 161, 162. The conductive heating devices 161, 162 are positioned proximate slab 101 to deliver (e.g., directly or indirectly via one or more intermediate layers) conductive heat to slab 101. In some exemplary embodiments, the heating device may include a first conductive pad 161 and a second conductive pad 162. For example, first conductive pad 161 may be situated adjacent to the first major surface 121 of slab 101 and between slab 101 and mold 150. Second conductive pad 162 may be situated adjacent to the second major surface 122 of slab 101.

Alternatively or additionally, the heating devices may deliver heat to slab 101 via radiant and/or convective heat transfer modes. For example, the heating devices may deliver heat by microwave radiation, one or more heating elements spaced from the slab, a liquid bath or shower (e.g., water, oil, etc.), forced convective fluid flow (e.g. non-liquid convective fluid, liquid convective fluid, air from a fan or blower, etc.), etc. Such heating modes can facilitate heat transfer throughout a thickness of the slab, and can be applied to one or both major surfaces of the slab simultaneously. In some embodiments, heat can be applied to one or both major surfaces while the slab is shaped to a mold surface. In various exemplary embodiments, application of heat in this manner can facilitate a relatively small radius of curvature.

The heating device may be configured to deliver heat to a substantial portion of first and second major surfaces 121, 122, respectively. For example, first conducting heating device 161 may be configured to deliver heat via contact with (e.g., directly or indirectly via one or more intermediate layers) more than 50%, more than 75%, more than 85%, more than 90%, more than 95%, or all of first major surface 121 of slab 101. Alternatively or additionally, second conducting heating device 162 may be configured to deliver heat via contact with more than 50%, more than 75%, more than 85%, more than 90%, more than 95%, or all of second major surface 122 of slab 101. Delivery of heat to substantial portions of first and/or second surfaces 121, 122 may facilitate rapid and consistent heating of slab 101, and in turn promote rapid forming of slab 101.

The heating device may include heating device portions that are independently positionable with respect to one another and/or with respect to the mold 150. For example, first conductive pad 161 may be positionable on slab 101 or mold 150 independently of second conductive pad 162 (e.g., such that first conductive pad 161 is adjacent first major surface 121 and second conductive pad 162 is adjacent second major surface 122). In other exemplary embodiments, first conductive pad 161 and second conductive pad 162 may be connected together and form portions of a unitary heating device. For example, the heating device may be foldable (e.g. around a thickness of slab 101) such that first conductive pad 161 is adjacent first major surface 121 and second conductive pad 162 is adjacent second major surface 122 of slab 101 while first and second conductive pads 161, 162 are joined to one another (e.g., and share one or more conductive elements).

In some embodiments, one or both of first and second conductive heating devices 161, 162 may be attached or embedded in mold 150. For example, first conductive heating pad may form at least a portion of curved surface 151 or be attached to an outer or inner face of curved surface 151. In some embodiments, mold 150 is made from a substantially insulative material such as wood, fiberglass, ceramic, plaster, cement, stone, etc. Alternatively or additionally, one or more portions of mold 150 may be thermally conductive to facilitate heat transfer to slab 101 (e.g., curved molding surface 151 may be a thermally conductive metal, such as when heating device 161 is located on an internal face of curved molding surface 151, or when two or more conductive heating pads are used on the same molding surface).

In some embodiments, slab 101 can be secured to mold 150, such as by one or more clamps 170. Clamps 170 may be configured to maintain slab 101 in a particular position and/or orientation relative to mold 150 (e.g., during a molding operation). Alternatively or additionally, clamps 170 may act on slab 101 to conform slab 101 to a shape of mold 150. For example, clamps 170 may apply a force on slab 101 so that slab 101 conforms to a shape of mold 150. In various exemplary embodiments, clamps 170 may include one or more of a parallel-type clamp, a bar-type clamp, a pneumatic clamp, hydraulic clamp, or the like that can bend and/or maintain slab 101 in a position relative to mold 150.

The heating devices may provide continuous heating to slab 101. In some embodiments, a single conductive pad, such as first conductive pad 161, can provide continuous heating to slab 101 (e.g., while slab 101 is formed to mold 150) to elevate the temperature of slab 101 throughout the entire thickness of slab 101. A conductive pad maintained in constant contact (e.g., directly or indirectly) with slab 101 facilitates consistent heating of slab 101. In some embodiments, two or more conductive pads, such as first conductive pad 161 and second conductive pad 162 can, together, provide continuous heating to slab 101 (e.g., while slab 101 is formed to mold 150), to elevate the temperature of slab 101 throughout the entire thickness of slab 101. First and second conductive pads positioned adjacent first and second major surfaces 121, 122 of slab 101 facilitate rapid and consistent heating of slab 101. The temperature of slab 101 may be substantially consistent within a relatively controlled range throughout the entire thickness of slab 101. Such heating may facilitate precise temperature control of slab 101, and an efficient molding operation. Alternatively or additionally, system 100 having conducting heating devices 161, 162, for example, can facilitate molding a slab 101 that is not heated prior to placing on mold 150 (e.g., the slab is at room temperature when placed on the mold 150).

In some embodiments, mold 150 is configured to form a curve into slab 101 having a radius of curvature 180. The radius of curvature 180 is the radius of an imaginary circle 181 that approximately fits the curve of slab 101 produced by mold 150. Slab 101 may be formed such that the curve has a consistent radius of curvature along the curve. In other embodiments, slab 101 may be formed such that the curve is a complex curve having a radius of curvature that varies along the curve. Radius of curvature 180 may be a minimum radius of curvature along the entire curve.

Figure 2:
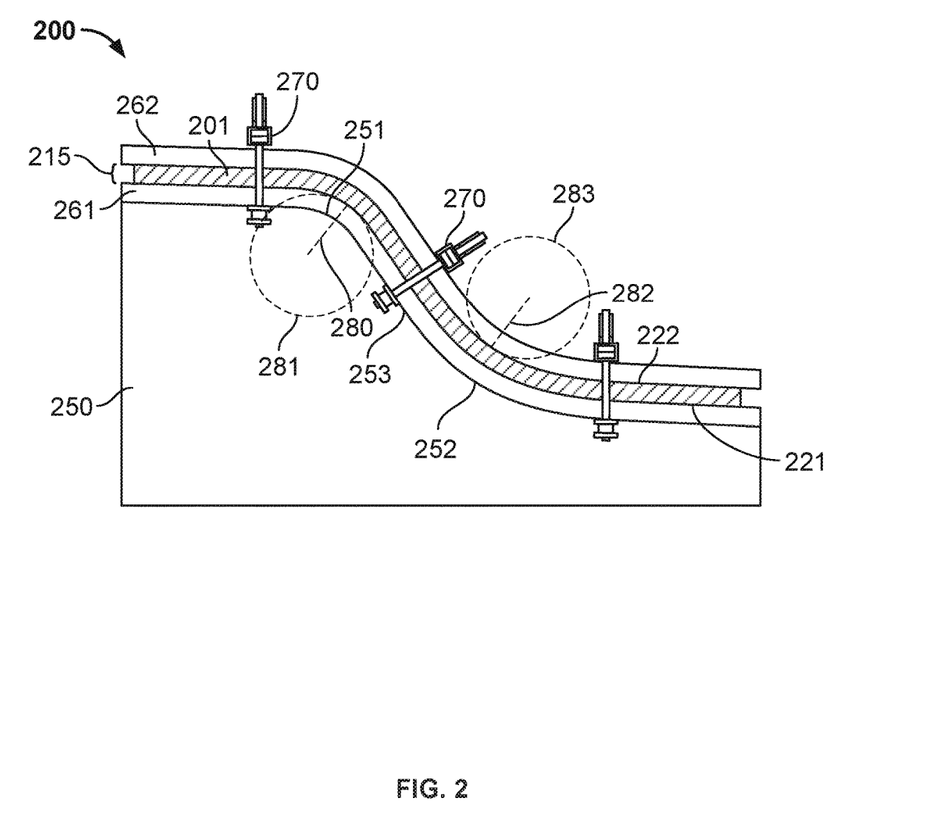
FIG. 2 is a plan view of an exemplary system for thermoforming a curved slab having two adjacent curves.

Referring to FIG. 2, a mold can include two or more curved shapes, such as in the exemplary system 200 for thermoforming a slab. In some embodiments, system 200 may include features similar to system 100 described above. System 200 may include a mold 250 and a heating device, such as heating devices 261, 262. Mold 250 includes surfaces defining two or more curved shapes spaced from one another that can be imparted to a slab by conforming the slab to the surfaces of the mold 250.

Slab 201 has a first major surface 221, a second major surface 222, and a thickness 215 separating the first major surface 221 and the second major surface 222. First and second surfaces 221, 222 may be curved to conform to a shape of mold 250. In an exemplary embodiment, slab 201 is supported entirely on mold 250. Alternatively or additionally, slab 201 may be supported by one or more support devices (e.g., while mold 250 functions primarily to provide shaped surfaces).

The heating devices of system 200 are configured to warm slab 201 to a moldable temperature to facilitate deformation and/or molding of slab 201 to a shape of mold 250. In an exemplary embodiment, the heating device includes one or more conductive heating devices 261, 262. The conductive heating devices are positioned proximate slab 201 to deliver (e.g., directly or indirectly via one or more intermediate layers) conductive heat to slab 201. In some exemplary embodiments, the heating device may include a first conductive pad 261 and a second conductive pad 262. For example, first conductive pad 261 may be situated adjacent to the first major surface 221 of slab 201 and between slab 201 and mold 250. Second conductive pad 262 may be situated adjacent to the second major surface 222 of slab 201.

In an exemplary embodiment, mold 250 is configured to impart two curved shapes to slab 201. Mold 250 includes a first curved molding surface 251 having a first radius of curvature 280, wherein the first radius of curvature 280 is the radius of a first imaginary circle 281 that approximately fits at least a portion of the first curve of slab 201 produced by mold 250. Mold 250 includes a second curved molding surface 252 having a second radius of curvature 282, wherein the second radius of curvature 282 is the radius of a second imaginary circle 283 that approximately fits at least a portion of the second curve of slab 201 produced by mold 250. The first curved molding surface 251 of mold 250 defining the first radius of curvature 281 may be spaced from the second curved molding surface 252 of mold 250 defining the second radius of curvature (e.g., spaced along a length and/or width of mold 250). For example, an intermediate portion 253 may be present between first and second curved molding surfaces 251, 252.

The heating device may include portions that are positionable independently of one another. For example, first conductive pad 261 may be positionable on slab 201 or mold 250 independently of second conductive pad 262 (e.g., such that first conductive pad 261 is adjacent first major surface 221 and second conductive pad 262 is adjacent second major surface 222). In other exemplary embodiments, first conductive pad 261 and second conductive pad 262 may be connected together and form portions of a unitary heating device. For example, the heating device may be foldable (e.g. around a thickness of slab 201) such that first conductive pad 261 is adjacent first major surface 221 and second conductive pad 262 is adjacent second major surface 222 of slab 201 while first and second conductive pads 261, 262 are joined to one another (e.g., and share one or more conductive elements).

In an exemplary embodiment, first conductive pad 261 may deliver heat at locations of each curved shape. For example, the first conductive pad 261 extends along substantially all of first major surface 221 of slab 201 including an intermediate location between each curved shape. Alternatively or additionally, second conductive pad 262 may deliver heat at locations of each curved shape. For example, the second conductive pad 262 extends along substantially all of second major surface 222 of slab 201 including the intermediate portion 253 between each curved surface. Such a configuration may facilitate consistent heating of slab 201 such that slab 201 may readily conform to mold 250 and/or facilitate curves in two different directions.

In some embodiments, the slab 201 may be heated with different heating devices (e.g., heated independently) at the location of each curved surface. For example, only first conductive pad 261 may be used to deliver heat to slab 201 proximate the first curved molding surface 251, and only the second conductive pad 262 may be used to deliver heat to slab 201 proximate the second curved molding surface 252. System 200 may further include third and fourth conductive heating pads such that first and second major surfaces are heated proximate the first and second curved molding surfaces 251, 252. In some embodiments, an intermediate portion 253 between the first and second curved molding surfaces 251, 252 is not directly heated (e.g., and is maintained at a relatively lower temperature than the locations of the curved shapes during a molding operation).

Curved slab 201 may be suitable for use as a countertop, table, flooring, wall, column, faux column, cladding, bath or shower surround, sink, or other building material application. In some embodiments, a curved slab 201 have multiple curved locations may provide a unitary countertop having surfaces of different heights. For example, a first portion of the slab 201 may provide a countertop surface at a relatively taller height, and a second portion of the slab 201 may provide a countertop surface at a relatively shorter height. Curved slab 201 may thus provide a unitary, continuous surface having two or more countertop surface heights, while reducing the appearance of joints or seams, and associated seaming operations, that may otherwise be required.

Figure 3:
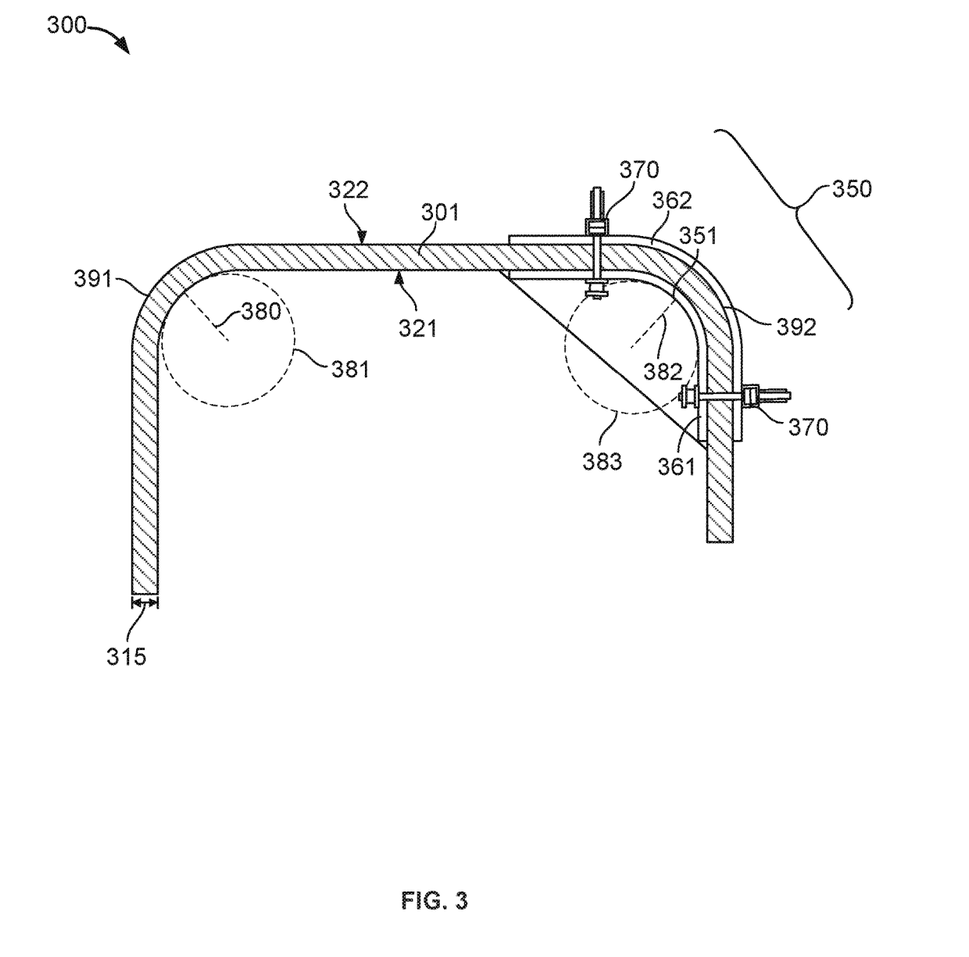
FIG. 3 is a plan view of an exemplary system for thermoforming a curved slab having more than one curve.

Referring to FIG. 3, an exemplary system 300 is shown for forming one or more curves in a slab 301. System 300 includes a mold 350 and a heating device, such as heating devices 361, 362. Mold 350 can, in some embodiments, be used to impart a first curve 391 to a first portion of the slab, then moved to a second portion of the slab to impart a second curve on a second portion of the slab. In other embodiments, two or more molds may be used at the same time, or at different times, on different portions of the same slab, to impart multiple curves on the same slab. In some embodiments, system 300 may include features similar to systems 100, 200 described above.

System 300 may be used to impart a curve in slab 301 (e.g., after slab 301 already includes a curved surface 391). For example, slab 301 includes a first curve 391, having a first radius of curvature 380 that is the radius of first imaginary circle 381. First curve 391 was previously formed in slab 301, for example, by an exemplary method described herein. Mold 350 includes a curved molding surface 351 that slab 301 is formed around to generate second curved surface 392.

The heating device of system 300 is configured to warm a portion of slab 301 (e.g., a portion of slab 301 not including curved surface 391) to a moldable temperature sufficient to facilitate deformation and/or molding of slab 301 to curved molding surface 351 of mold 350. In an exemplary embodiment, the heating device includes one or more conductive heating devices 361, 362 situated adjacent to the first major surface 321 and second major surface 322, respectively, of slab 301. Conductive heating devices may be configured to deliver heat only proximate curved surface 392, and not deliver heat to other portions of slab 301. Delivery of heat to first and second major surfaces 321, 322 of slab 301 only proximate curved surface 392 facilitates consistent heating at the location of curved surface 392 while maintaining the temperature of slab 301 below a moldable temperature to avoid inadvertent deformation of slab 301.

In an exemplary embodiment, slab 301 is not supported entirely on mold 350. Mold 350 may primarily function to provide a curved molding surface 351 that slab 301 may be conformed to, while one or more support devices support slab 301. Mold 350 may be readily positionable relative to slab 301 to form curved surface 392 at a desired location on slab 301, such as a desired location along a length of slab 301. Mold 350 may thus be used to generate multiple slabs 301 having a variety of configurations by positioning mold 350 at different locations on the slabs 301, and to form additional curved surfaces in slabs 301 that already include one or more curved surfaces.

Figure 4A:
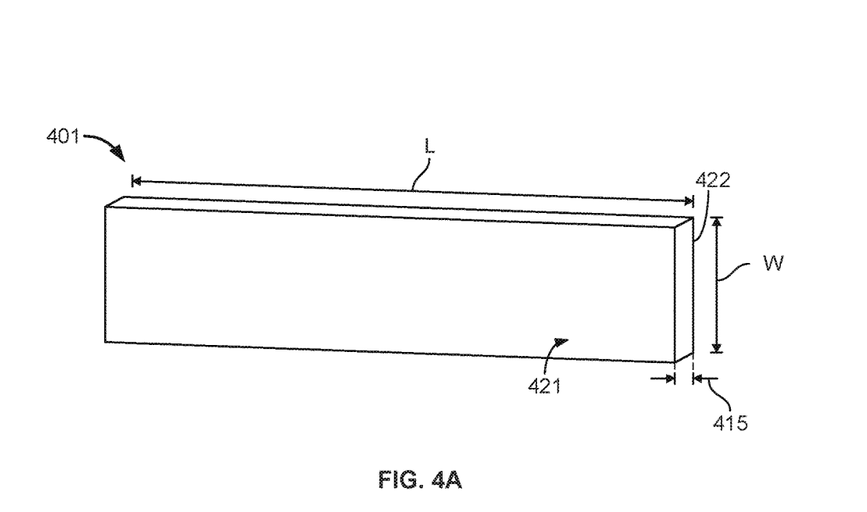
FIG. 4A is a perspective view of an exemplary slab prior to undergoing a thermoforming method.

Referring now to FIG. 4A, an exemplary stone slab 401 is shown that includes a planar first major surface 421 and a planar second major surface 422 separated by a thickness 415. Stone slab 401 may be processed and/or cut to have a length L and a width W, as desired for a particular application. For example, stone slab 401 may be a relatively large slab that may be cut to specific shapes for use in living or working spaces (e.g., along a countertop, table, floor, or the like). In various exemplary embodiments, stone slab 401 is at least 3 feet wide by at least 6 feet long, for example between about 3 feet and 18 feet wide and between about 6 feet and 24 feet long, or between about 4.5 feet and 7 feet wide and between about 10 feet and 12 feet long. In some exemplary embodiments, stone slab 401 is about 7 feet wide by about 12 feet long. In other embodiments, stone slab 401 is about 4.5 feet wide (approximately 140 cm wide) by about 10 feet long (approximately 310 cm long). In some embodiments, stone slab 401 may be a relatively small slab or slab strip (e.g. having a relatively small width and relatively large length). Small slabs or slab strips may facilitate applications as molding, mitered edges, or other installation locations where a small slab may be appropriate. The slab strip 401 may be curved to complement a relatively large slab, installation environment, or impart a particular aesthetic appearance. In some embodiments, one or more curves may be imparted on all of stone slab 401. In some embodiments, one or more curves may be imparted on one or more portions of stone slab 401. In some exemplary embodiments, stone slab 401 has rectangular edges, or can be mitered or otherwise processed to include various edge profiles, such as bullnose, half bullnose, waterfall, reverse waterfall, double pencil, mitered edge, shale edge, cornice, ledge, ogee, bevel, angle cut, round double, eased, or other edge profile.

In some embodiments, the thickness 415 of the slab 401 is at least about 0.01 inches, at least 0.2 inches, between about 0.01 inches and about 5 inches, between about 0.1 inches and about 3 inches, between about 0.1 inches and about 1 inch, or between about 0.25 inches and about 2.0 inches. In some embodiments, the thickness 415 of the slab is between about 0.1 and about 0.75 inches, between about 0.1 and about 0.5 inches, or between about 0.1 inches and about 0.25 inches.

Figure 4B:
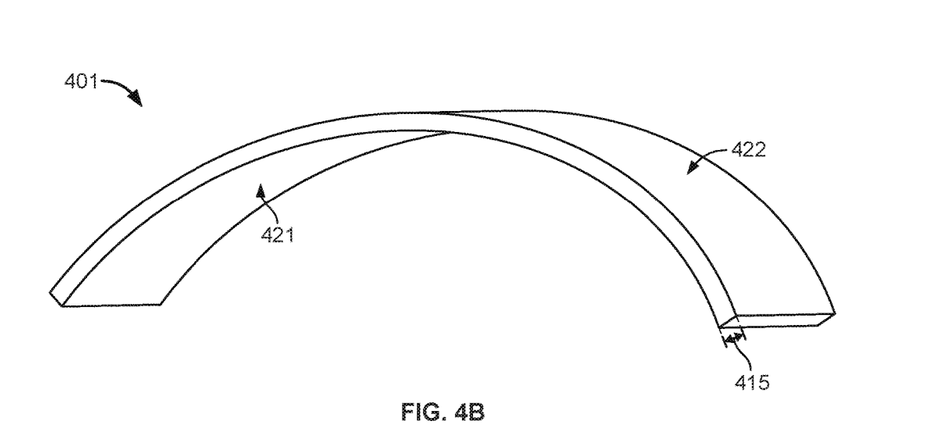
FIG. 4B is a perspective view of the slab of FIG. 4A after undergoing an exemplary thermoforming method.

Referring now to FIG. 4B, exemplary slab 401 is shown after being curved to form a curved slab 401. Curved slab 401 includes a first major surface 421 separated from a second major surface 422 by a slab thickness 415. First and second major surfaces 421, 422 exhibit curved shapes defined by one or more radii of curvature.

In some embodiments, a stone slab having a thickness of between about 0.1 inches and about 2.0 inches can be formed to molds producing radii of curvature between about 18 inches and about 100 inches. In some embodiments, a stone slab having a thickness of between about 0.1 inches and about 1.0 inches can be formed to molds producing radii of curvature between about 36 inches and about 100 inches. In some embodiments, a stone slab having a thickness of between about 0.1 inches and about 1.5 inches can be formed to molds producing radii of curvature between about 60 inches and about 100 inches. In some embodiments, a stone slab having a thickness of between about 0.5 inches and about 3 inches can be formed to molds producing radii of curvature between about 80 inches and about 100 inches.

In some embodiments, stone slabs described herein may be attached with a support backing. For example, a first surface of the stone slab may be a polished surface having a desired aesthetic appearance, and a second surface of the stone slab may be adhered to the support backing. The support backing may include a relatively lightweight structural backing that provides additional strength and support to the stone while remaining lighter than a stone slab without the structure backing having the same thickness as the support backing. The support backing may allow thinner stone slabs to be used, and can provide reduced weight of stone used, in a given application. Exemplary support backing materials can include metal, fiberglass, or any material that is lighter than a stone slab having the same thickness as the support backing and can provide structural support to the stone slab. The support backing may include a lattice structure that supports the stone slab and reduces the occurrence of cracking, breaking, etc. In some embodiments, the support backing at least partially maintains the stone slab in a curved shape. In some embodiments, the support backing can provide protection to the stone slab during shipping, installation, or use. The stone slab can be affixed to the support backing using an adhesive, such as a glue, adhesive tape, mechanical fasteners, or the like. The support backing may allow the stone slab to be used in a variety of applications that may require or benefit from a lightweight structure, such as wall coverings, veneers, automotive applications, etc.

In some embodiments, the support backing can be a part of the stone slab before undergoing any of the methods described herein (e.g., such that the stone slab and support simultaneously undergo bending/molding to produce the curved slab). For example, applying heat to the stone slab, and/or continuously heating the stone slab, may include applying heat to and/or continuously heating a major surface of a support backing. Alternatively or additionally, the stone slab may be curved or partially curved before being joined with the support backing.

In various exemplary embodiments, curved slabs 401 may include processed stone slabs, tiles, partial stone slabs, etc. For example, processed stone slabs can include organic polymer(s) and inorganic (mineral) particulate components. The inorganic (mineral) particulate component may include such components as silicon, basalt, glass, diamond, rocks, pebbles, shells, a variety of quartz containing materials, such as, for example, but not limited to: crushed quartz, sand, quartz particles, and the like, or any combination thereof. In some embodiments, the particulate mineral components comprise a quartz material as a predominant component, which may include sand of various particle sizes and of different combinations.

In a hardened slab, the organic and inorganic materials can be linked using a binder, which may include for example, mono-functional or multifunctional organosilane molecules, dendrimeric molecules, and the like, that may have the ability to bind the organic and inorganic components of the composite stone mix. The binders may further include a mixture of various components, such as initiators, hardeners, catalysts, binding molecules and bridges, or any combination thereof. In some embodiments, the slabs may include about 80-95% quartz aggregates to about 5-15% polymer resins. In addition, various additives, may be present, including metallic pieces (e.g., copper flecks or the like), colorants, dyes, pigments, chemical reagents, antimicrobial substances, fungicidal agents, and the like, or any combination thereof.

In some embodiments, the particles (e.g., mineral particulate components) present in the composite stone mix have a particle size of less than about 0.2 inches. In some embodiments, the particles range in size from about 0.0001 inches to about 0.2 inches, from about 0.0002 inches to about 0.08 inches, from about 0.0002 inches to about 0.07 inches, from about 0.00025 inches to about 0.01 inches, or from about 0.0002 inches to about 0.002 inches. In some embodiments, such relatively small particle sizes facilitate a small radius of curvature without cracking, blemishes, or loss of particulate matter in a finished curved slab.

In some embodiments, particle size, slab thickness, and radius of curvature of curved shapes of the slab may be selected to produce a curved slab having beneficial characteristics. In some embodiments, exemplary slabs may have thicknesses between about 0.01 inches and about 4 inches, one or more curves having radii between about 50 inches to about 100 inches, and particle sizes up to about 0.05 inches, 0.1 inches, 0.15 inches, or up to about 0.2 inches or more. In another exemplary embodiment, exemplary slabs may have slab thicknesses between about 0.1 inches to about 0.25 inches, one or more curves having radii between about 18 inches and about 100 inches or more, and particle sizes less than about 0.0001 inches, 0.0005 inches, or less than about 0.001 inches.

In some embodiments, the starting material for the methods and systems described herein include previously formed, hardened, processed stone slabs. For example, a slab may be fully formed such that the particulate material, binder, and other components of the slabs have previously been subject to vibration, compression molding, compaction, curing, thermoforming, and/or combinations thereof, to produce a hardened slab. The slab may be thermoformed in a subsequent operation to impart one or more curved shapes to the slab. Thus, in some exemplary methods described herein, the slab has been previously compacted, compressed, cured, thermoformed, or any combination thereof, prior to heating the slab in a forming operation (e.g., on a mold having a curved molding surface). In some embodiments, the methods for thermoforming described herein are thus methods of post-forming stone slabs that have substantially planar major surfaces.

Alternatively or additionally, a slab may be formed to have one or more curved surfaces as part of the original manufacturing operation or immediately following original manufacturing (e.g., at the same facility where initial manufacturing occurs, or at the end of the manufacturing line where original manufacturing occurs). In some embodiments, a slab may be thermoformed before the slab has fully cooled from an initial manufacturing operation. Thermoforming immediately following an initial manufacturing line may reduce energy usage by reducing the heat required due to the slab already being at an elevated temperature, and/or by reducing handling and transportation (e.g., transportation to a remote location in order to conduct the thermoforming operation).

In an exemplary embodiment, an original manufacturing process of forming a slab may include an operation of dispensing one or more pigmented particulate mineral mixes into a mold to generate a slab having a desired aesthetic appearance. After the mold has been sufficiently filled, the mold may be moved to one or more subsequent operations, such as a vibro-compaction press operation during which compaction pressure, vibration, and/or vacuum may be applied to the contents inside the filled mold, thereby converting the one or more particulate mixes into a rigid slab. After a vibro-compaction operation, the filled mold (with the compacted and hardened slab therein) may proceed to a curing operation during which the material used to form the slab (including any resin binder material) are cured via a heating or other curing process, thereby further strengthening the slab inside the filled mold. After the slab is fully cured and sufficiently cooled, the hardened and cured slab may be removed from the mold at a mold removal operation. In some embodiments, the slab may be thermoformed after the curing process before the slab has fully cooled to impart one or more curved surfaces, as described herein. The method may further include a finishing operation, during which a major surface of the slab is finished, such as by polishing to a smooth finish, or otherwise imparting a polished, matte, honed, raw, or other finish.

Figure 5:
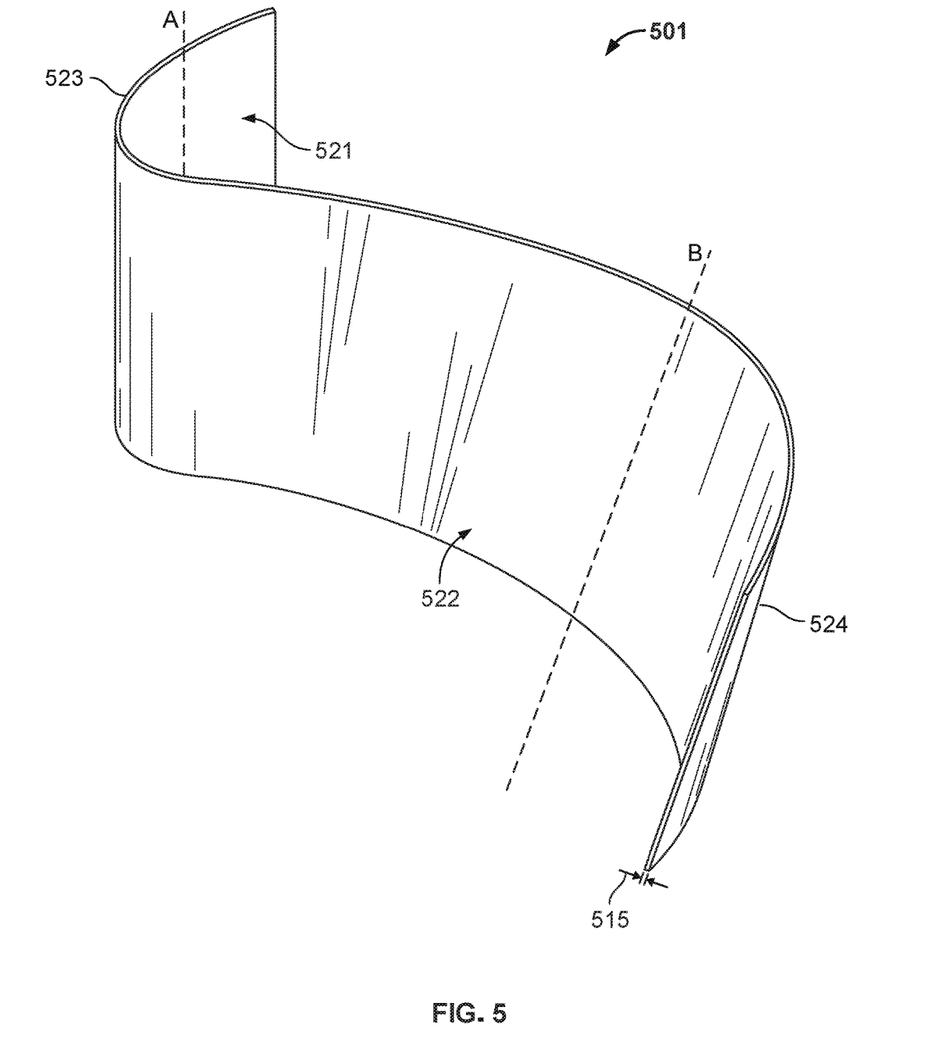
FIG. 5 is a perspective view of an exemplary slab that includes curvature about multiple axes.

Referring now to FIG. 5, an exemplary stone slab 501 is shown that includes a first major surface 521 and a second major surface 522 separated by a thickness 515. Stone slab 501 includes multiple complex curved portions imparted by a mold (e.g. as described herein). The curved portions may be defined by one or more radii of curvature, such that a radius of curvature varies across a particular curve. Alternatively or in addition, the curved portions can curve about different axes. For example, a first curved portion 523 may include a curve about an axes A that is substantially vertical, and a second curved portion 524 may include a curve about an axis B that is angled from vertical. A stone slab have complex curvature (e.g. formed as described herein) may promote an organic appearance and/or facilitate a precise shape suitable for a particular installation location.

Figure 6:
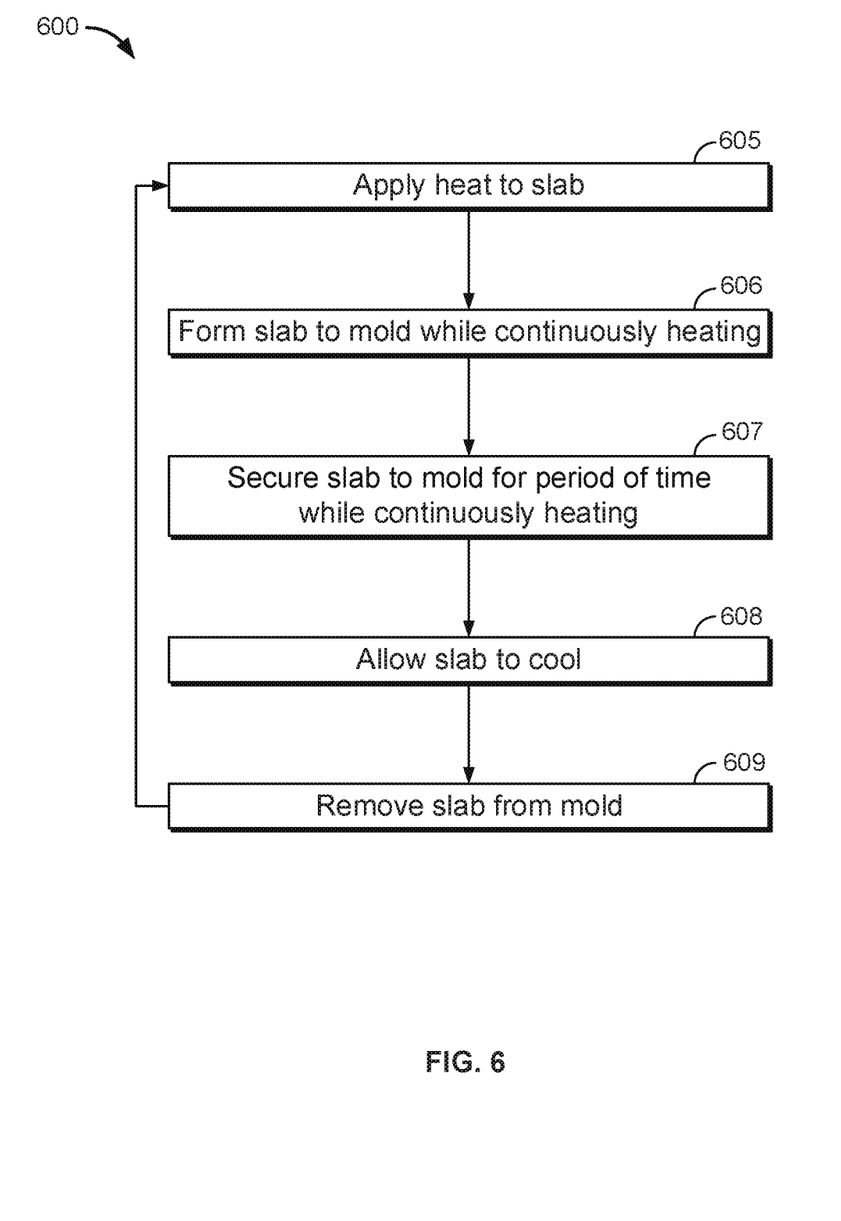
FIG. 6 is a flow diagram of an example method of thermoforming a slab.

Referring to FIG. 6, a flow diagram of an exemplary method 600 for thermoforming a stone slab is shown, including applying heat to the slab, and forming the slab around a mold while continuously applying heat to the slab. In some optional embodiments, the method can begin immediately after processed stone slab has come off the manufacturing line. For example, a processed stone slab can be produced from composite mixes, such as those described herein, by mixing the components, pouring the mixture into a mold, and compacting, vibrating, curing, thermoforming, or otherwise solidifying the slab. Then, the newly fabricated slab can move directly from the production line to a mold as described herein for thermoforming the slab to have one or more curves. In some embodiments, the slab can optionally be further processed, such as by cutting, mitering, edge finishing, surface finishing, polishing, or other processing, prior to thermoforming the slab to have one or more curves. In some embodiments, the slab can optionally be further processed, such as by cutting, mitering, edge finishing, surface finishing, polishing, or other processing, after thermoforming the slab to have one or more curves. In some embodiments, hardened processed slabs can be molded to have one or more curves at a location remote from the production line. For example, a processed stone slab can be produced from composite mixes, such as those described herein, by mixing the components, pouring the mixture into a mold, and compacting, vibrating, curing, thermoforming, or otherwise solidifying the slab, and then stored for some time and/or shipped to a remote location, such as a warehouse, distributor, or installation site. Then the slab can be thermoformed on a mold to form one or more curves in the slab. The slab may be optionally further processed, such as by cutting, mitering, edge finishing, polishing, or other processing, before or after storage or shipping, and before or after thermoforming the slab to have one or more curves. The methods described herein advantageously allow flexibility in where the curve thermoforming can take place, as the use of conductive heat sources such as conductive pads allows for portability.

Exemplary method 600 may include operation 605 of applying heat to a slab positioned on a mold. In some embodiments, the slab may have features similar to slabs 101, 201, 301, 401 and/or 501, etc. described herein. Applying heat to the stone slab may include applying conductive heat to the slab, such as directly or indirectly applying conductive heat using a positionable conductive heating pad, resistive heating wires, or other heating element that conductively transfers heat to the slab. For example operation 605 of applying heat can include continuously heating a first conductive pad positioned on the first major surface of the slab (e.g., by modulating current through a resistive heating element of the conductive pad).

In some embodiments, operation 605 of applying heat can include heating a second conductive pad positioned on the second major surface of the slab simultaneously with the first conductive heating pad. Applying heat simultaneously to first and second major surfaces of the stone slab may facilitate a consistent temperature through an entire thickness of the stone slab, and may facilitate a reduced heating time required for the slab temperature to rise to a temperature sufficient for molding of the slab.

In an exemplary embodiment, operation 605 of applying heat to the slab includes heating the slab from ambient temperature after the slab is placed on the mold. For example, the slab may not be pre-heated such that the slab is at ambient temperature when placed on the mold. Applying heat to raise a temperature of the slab to a moldable temperature may thus be performed entirely while the slab is on the mold. In other exemplary embodiments, the slab may be preheated to an elevated temperature before being placed on the mold. Operation 605 of applying heat may include continuously applying heat to maintain a slab temperature at a moldable temperature while the slab is conformed to a surface of the mold.

In various exemplary embodiments, operation 605 of applying heat to the slab may, alternatively or additionally, include non-conductive modes of heating, including radiant heating and/or convective heating modes. For example, operation 605 may include applying heat by microwave radiation, one or more heating elements spaced from the slab, a liquid bath or shower (e.g., water, oil, etc.), forced convective fluid flow (e.g. non-liquid convective fluid, liquid convective fluid, air from a fan or blower, etc.), etc. Such heating modes can facilitate heat transfer throughout a thickness of the slab, and can be applied to one or both major surfaces of the slab simultaneously. In some embodiments, operation 605 can include applying heat by one or more heating modes to one or both major surfaces of the slab while the slab is shaped to a mold surface. In various exemplary embodiments, applying heat in this manner can facilitate a relatively small radius of curvature.

Operation 605 of applying heat to the slab includes applying heat to maintain a temperature of at least a portion of the slab at a moldable temperature at which the slab may bend and conform to a shape of the mold without cracking. In an exemplary embodiment, a moldable temperature may be determined based on a surface temperature of the slab (e.g., and the temperature of the heating pad). Alternatively or additionally, a moldable temperature may be determined based on an internal temperature of the slab. Thus, heating devices can be controlled based on a measured or calculated temperature of one or more of a temperature of a portion of a major surface of the slab, an internal temperature of a portion of the slab, a temperature of at least a portion of a heating device (e.g. the first and second conductive pads), and/or a temperature to which a heating device has been set. In some embodiments, a heating mechanism may operate cyclically to heat and maintain a temperature setting (e.g., by modulating an electrical current through a resistive heating element). Thus the temperatures described herein, as well as the operation of applying heat and/or continuously heating described herein, can include periods of minimal temperature changes as the heating mechanism cycles on and off to maintain a set temperature. In some embodiments, temperatures described herein refer to average temperatures of a slab portion, slab surface portion, internal slab portion, heating mechanism portion, or the like, across a period of time for which a heating mechanism is heating or continuously applying heat.

In some embodiments, a curve may be desired on only a portion of a slab, and operation 605 of applying heat to the slab may include continuously applying heat only to a selected portion of the slab that is intended to be molded. The portion of a slab that is being molded may exhibit differing temperatures across one or more surfaces of the portion of the slab, or throughout the thickness of the portion of the slab being molded, while being maintained at or near a moldable temperature.

Operation 605 of applying heat may include applying heat for a period of time sufficient to reach a moldable temperature, for example, a temperature that renders the slab moldable. In some embodiments, when heated to its moldable temperature, the slab can bend to produce a curve, for example a curve having a radius of curvature of less than 100 inches, such as between 18 inches and 100 inches, 23 inches and 80 inches, 36 inches and 72 inches, or about 50 inches, without visible breakage or cracks. In some embodiments, a moldable temperature can include a temperature ranging from about 30° C. to about 200° C., 50° C. to about 150° C., or about 100° C.

In some embodiments, the moldable temperature is related to a glass transition temperature (Tg) of the slab, such as a glass transition temperature (Tg) of a resin binder or one or more other components of the slab. Tg can be measured by any of the standard processes for measuring Tg, such as by differential scanning calorimetry (DSC), thermal mechanical analysis (TMA), or dynamic mechanical analysis (DMA). Standard protocols such as ASTM E1640-13, ASTM E1545-11, ASTM E2602-09, ASTM E1356-08, ASTM D7028, or the like may be used. In some embodiments, a moldable temperature can include a temperature or range of temperatures at or below the Tg. For example, the moldable temperature to which the slab is heated may be maintained within a selected deviation from the glass transition temperature to avoid affecting the structural characteristics of the final slab. The slab can thus be heated, molded, and cooled to impart a curved surface without adversely affecting the structural characteristics of the slab by controlling application of heat within a desired range of the glass transition temperature Tg.

In some embodiments, a moldable temperature can include a temperature within 5° C. of the Tg of one or more components of the slab, within 15° C., within 20° C., or within 35° C. of the Tg of one or more components of the slab. In some embodiments, a moldable temperature can include an altered Tg of a polymer component or resin binder of the slab. For example, while a specific polymer has a first Tg, binding of the particulate matter to the polymer, copolymerization, and addition of plasticizers, hardeners, initiators, or other additives can alter the Tg of the polymer. In some embodiments, a moldable temperature can include a temperature within 5° C. of the Tg of one or more components of the slab, within 15° C., within 20° C., or within 35° C. of the altered Tg of one or more components of the slab.

In some embodiments, the moldable temperature is related to a Vicat softening point of the slab, such as a Vicat softening point of a resin binder or one or more other components of the slab. As used herein, the Vicat softening point temperature describes a temperature at which an amorphous material changes from a brittle vitreous state to a plastic, deformable, flexible, or viscous state. The Vicat softening point temperature can be measured by standard protocols such as ASTM-D1525, ISO 306, or the like. In some embodiments, the Vicat softening point of the slab or of a component of the slab can be at or below the Tg of the slab or component of the slab. In some embodiments, a moldable temperature can include a temperature or range of temperatures at or above the Vicat softening point of the slab or a component of the slab. For example, the moldable temperature to which the slab is heated may be maintained within a selected deviation above the Vicat softening point temperature but below the glass transition temperature Tg of the slab to avoid affecting the structural characteristics of the final slab. The slab can thus be heated, molded, and cooled to impart a curved surface without adversely affecting the structural characteristics of the slab by controlling application of heat within a desired range above the Vicat softening point but below the glass transition temperature Tg.

In some embodiments, a moldable temperature can include a temperature at or up to 5° C. above the Vicat softening point temperature of one or more components of the slab, up to 15° C. above, up to 20° C. above, or up to 35° C. above the Vicat softening point temperature of one or more components of the slab. In some embodiments, a moldable temperature can include an altered Vicat softening point temperature of a polymer component or resin binder of the slab. For example, while a specific polymer has a first Vicat softening point temperature, binding of the particulate matter to the polymer, copolymerization, and addition of plasticizers, hardeners, initiators, or other additives can alter the Vicat softening point temperature of the polymer. In some embodiments, a moldable temperature can include a temperature at or up to 5° C. above the altered Vicat softening point temperature of one or more components of the slab, up to 15° C. above, up to 20° C. above, or up to 35° C. above the altered Vicat softening point temperature of one or more components of the slab.

In some embodiments, the moldable temperature is related to a heat deflection temperature or heat distortion temperature (HDT) of the slab, such as the HDT of a resin binder or one or more other components of the slab. As used herein, the HDT describes a temperature at which a polymer or plastic sample deforms under a specified load. The HDT can be measured by standard protocols such as ASTM-D648, ISO 75, or the like. In some embodiments, the HDT of the slab or of a component of the slab can be at or below the Tg of the slab or component of the slab. In some embodiments, a moldable temperature can include a temperature or range of temperatures at or above the HDT of the slab or a component of the slab. For example, the moldable temperature to which the slab is heated may be maintained within a selected deviation above the HDT but below the glass transition temperature Tg of the slab to avoid affecting the structural characteristics of the final slab. The slab can thus be heated, molded, and cooled to impart a curved surface without adversely affecting the structural characteristics of the slab by controlling application of heat within a desired range above the HDT but below the glass transition temperature Tg.

In some embodiments, a moldable temperature can include a temperature at or up 5° C. above the HDT of one or more components of the slab, up to 15° C. above, up to 20° C. above, or up to 35° C. above the HDT of one or more components of the slab. In some embodiments, a moldable temperature can include an altered HDT of a polymer component or resin binder of the slab. For example, while a specific polymer has a first HDT, binding of the particulate matter to the polymer, copolymerization, and addition of plasticizers, hardeners, initiators, or other additives can alter the HDT of the polymer. In some embodiments, a moldable temperature can include a temperature at or up to 5° C. above the altered HDT of one or more components of the slab, up to 15° C. above, up to 20° C. above, or up to 35° C. above the altered HDT of one or more components of the slab.

Method 600 further includes operation 606 of forming the slab to the mold while continuously heating the slab. In some embodiments, forming a slab to a mold can include conforming the slab to the shape of an external dimension of a mold. Forming the slab to a mold can, in some embodiments, include forming the slab to a mold while simultaneously applying the conductive heat to the first and second major surfaces. For example, operations 605 and 606 may be performed at least partially simultaneously such that the slab is heated and molded to a shape of the mold at the same time.

The slab may be maintained at a moldable temperature until the slab has completely conformed to the shape of the mold. In some embodiments, a period of time sufficient to allow the slab to conform to a mold includes from about 1 minute to about 240 minutes.

Operation 606 of forming the slab to the mold may, in some embodiments, include forming one or more curves having a radius of curvature defined as the radius of an imaginary circles that approximately fits the curve. In some embodiments, forming a slab to a mold includes forming a curve having a minimum radius of curvature of less than about 100 inches. In some embodiments, forming a slab to a mold includes forming a curve having a minimum radius of curvature of about 18 inches or greater, about 20 inches or greater, about 22 inches or greater, or about 25 inches or greater. In some embodiments, forming the slab to the mold includes forming a curve having a minimum radius of curvature from about 18 inches to about 100 inches. In some embodiments, forming a slab to a mold includes forming a curve having a minimum radius of curvature of greater than about 100 inches. In some embodiments, forming a slab to a mold includes forming a curve having a minimum radius of curvature of between about 20 inches to about 80 inches, from about 23 inches to about 70 inches, from about 30 inches to about 60 inches, or from about 40 inches to about 50 inches. In some embodiments, operation 606 of forming the slab to the mold includes forming a curve having a minimum radius of curvature from about 20 inches to about 90 inches, from about 50 inches to about 90 inches, or from about 60 inches to about 80 inches.

The weight of a slab may, in some embodiments, provide sufficient pressure to conform the slab, at a moldable temperature, to a mold without requiring additional pressure. In some embodiments, additional pressure may be applied to conform a slab, at a moldable temperature, to a mold, or to hold a slab in place on a mold while heating or cooling the slab. Exemplary additional pressure that can be applied to the slab to conform the slab to the mold can include weights, clamps, hand pressure, or other pressure application. Method 600 may include operation 607 of securing the slab to the mold by applying one or more weights or clamps such as hand clamps, bar clamps, parallel clamps, pneumatic clamps, hydraulic clamps, or the like.

Forming the slab to the mold can include an iterative process of successively bending the slab toward the shape of the mold as the slab warms. One or more clamping mechanisms may be added or adjusted in stages (e.g., every minute, every 15 minutes, etc.) to gradually cause the slab to conform to the shape of the mold. For example, operation 607 may include clamping the slab in a curved configuration having a minimum radius of curvature greater than that of the corresponding curved surface of the mold for a first period of time while heat is simultaneously applied to first and second major surfaces of the slab, and clamping the slab in a curved configuration having a minimum radius of curvature substantially equal to that of the corresponding curved surface of the mold for a second period of time while heat is simultaneously applied to the first and second major surfaces. In this way, the slab can be gradually adjusted to conform to the mold.

Exemplary method 600 further includes operation 608 of allowing the slab to cool. Step 608 may, in some embodiments, commence directly after a slab has conformed to a mold, while in other embodiments, step 608 can commence a period of time after the slab has conformed to a mold. For example, after a slab has been secured to the mold in a desired shape, operation 605 of applying heat to the slab may cease such that the slab may cool. In some exemplary embodiments, a slab is allowed to cool for a period of time sufficient for the temperature of the slab to drop below the moldable temperature. In some embodiments, the slab is cooled to a temperature lower than 35° C. below the Tg of one or more components of the slab, a temperature lower than 45° C. below the Tg of one or more components of the slab, a temperature lower than 55° C. below the Tg of one or more components of the slab, a temperature lower than 65° C. below the Tg of one or more components of the slab. In some embodiments, the slab is cooled to a temperature lower than 35° C. below the altered Tg of one or more components of the slab, a temperature lower than 45° C. below the altered Tg of one or more components of the slab, a temperature lower than 55° C. below the altered Tg of one or more components of the slab, a temperature lower than 65° C. below the altered Tg of one or more components of the slab. In some embodiments, the slab is cooled to a temperature lower than 35° C. below the minimum moldable temperature of one or more components of the slab, a temperature lower than 45° C. below the minimum moldable temperature of one or more components of the slab, a temperature lower than 55° C. below the minimum moldable temperature of one or more components of the slab, a temperature lower than 65° C. below the minimum moldable temperature of one or more components of the slab.

Operation 608 may include passively cooling the slab, such as by removing application of heat. Alternatively or additionally, operation 608 may include actively cooling the slab, e.g. by blowing cool air across the slab, delivering a cool water bath to the slab, etc.

Method 600 further includes operation 609 of removing the slab from the mold. The slab removed from the mold may have a curved shape similar to a curved shape of the mold (e.g., as shown in FIGS. 1-5). In some embodiments, the slab may remain on the mold while operations 605, 606, 607, and/or 608 may be repeated to form another portion of the slab. After operation 609, the slab may proceed to one or more finishing operations, such as cutting, polishing or other treatment. For example, the slab may proceed to one or more finishing operations during which a major surface of the slab is finished, such as by polishing to a smooth finish, or otherwise imparting a polished, matte, honed, raw, or other finish.

In an exemplary embodiment, one or more operations 600 can be repeated one or more times on the same slab to form multiple different curves across the dimensions of the slab. In some embodiments, method 600 can be repeated one or more times on the same slab to form a single curve in multiple steps. In some exemplary embodiments, one or more operations may be repeated at a similar location of the slab to generate complex or organic curved surfaces that curve in multiple directions (e.g., about multiple different axes).

The operations of exemplary method 600 may follow any suitable sequence, and/or may be performed in parallel. For example, operation 605 of applying heat may be conducted during at least portions of operation 606 of forming the slab to the mold and operation 607 while the slab is secured to the mold. Likewise, operation 608 of cooling the slab may be conducted during at least portions of operation 606 of forming the slab to the mold and operation 607 while the slab is secured to the mold. In some exemplary embodiments, one or more surfaces of the stone slab may be treated or finished before a curve is imparted by method 600. For example, the slab may proceed to one or more finishing operations during which a surface of the slab is finished, such as by polishing to a smooth finish, or otherwise imparting a polished, matte, honed, raw, or other finish. The slab may be curved via one or more operations of method 600 without substantially affecting the surface (e.g. such that the polished, matte, honed, raw, or other finish is maintained and/or a subsequent finishing operation is not required to impart the polished, matte, honed, raw, or other finish). Alternatively or additionally, one or more steps depicted in FIG. 6 may be omitted, and one or more intermediate steps may be added.

Multiple curves and configurations of curves can be created in slabs according to the methods described herein. In some embodiments, a second, third, fourth, or additional curve can be on a portion of a slab that is not part of a first curve. In some embodiments, a second, third, fourth, or later curve can be made on a portion of a first or other curve. In some embodiments, slabs having varying radii of curvature are formed, such as organic shapes where the slabs bend at more than one angle and/or with varying degrees of curvature. In some embodiments, multiple molds may be used to form a single curve having multiple different curved shapes. In some embodiments, consecutive curves can bend in the same direction. In some embodiments, consecutive curves can bend in different directions. Exemplary configurations can include, but are not limited to, final slabs having a c-like shape, slabs having an s-like shape, slabs with symmetric or asymmetric curves, slabs having a curved step-like configuration, slabs with two or more curves having the same radius of curvature, slabs having two or more curves each having a different radius of curvature, etc.

The curved slabs described herein can be further processed, for example, cut, milled, machined, or otherwise processed to various shapes and sizes (e.g., to provide custom-fit countertop surfaces with optional holes for sinks, faucets, or other amenities, building materials that conform to a particular structure, etc.).

While this specification contains many specific implementation details, these should not be construed as limitations on the scope of any invention or of what may be claimed, but rather as descriptions of features that may be specific to particular embodiments. Certain features that are described in this specification in the context of separate embodiments can also be implemented in combination in a single embodiment in part or in whole. Conversely, various features that are described in the context of a single embodiment can also be implemented in multiple embodiments separately or in any subcombination. Moreover, although features may be described herein as acting in certain combinations and/or initially claimed as such, one or more features from a claimed combination can in some cases be exercised separate from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Although a number of implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other aspects, advantages, modifications, and implementations are within the scope of the following claims.

What is claimed is:

1. A method of thermoforming a slab, comprising:
applying conductive heat simultaneously to a first major surface and a second major surface of a slab comprising particulate material, the first major surface separated from the second major surface by a slab thickness; and
forming the slab to a mold while applying the conductive heat to the first and second major surfaces.

2. The method of claim 1, wherein the mold comprises a curved molding surface, and forming the slab to the mold comprises applying the conductive heat to the first and second major surfaces of the slab while at least one of the major surfaces is urged toward the curved molding surface of the mold.

3. The method of claim 1, wherein applying conductive heat comprises heating a first conductive pad positioned on the first major surface of the slab.

4. The method of claim 3, wherein applying conductive heat comprises heating a second conductive pad positioned on the second major surface of the slab.

5. The method of claim 1, wherein forming the slab comprises forming a curve having a radius of curvature of less than 100 inches.

6. The method of claim 1, wherein forming the slab comprises forming a curve having a radius of curvature between 18 inches and 80 inches.

7. The method of claim 1, wherein forming the slab comprises forming a curve having a radius of curvature between 23 inches and 70 inches.

8. The method of claim 6, wherein the radius of curvature is a minimum radius of curvature.

9. The method of claim 8 wherein the slab comprises a particulate material, one or more pigments, and one or more resin binders.

10. The method of claim 9, wherein the particulate material comprises predominantly quartz.

11. The method of claim 9, wherein the slab has a first major surface and a second major surface separated by a thickness, and the thickness is between 0.001 inches and 3 inches.

12. The method of claim 1, comprising manufacturing the slab by compacting, compressing, and at least partially curing the slab prior to applying conductive heat to the slab.

13. The method of claim 1, wherein applying conductive heat comprises applying heat above a slab moldable temperature, the slab at least partially malleable when heated to the slab moldable temperature.

14. The method of claim 1, wherein the slab comprises a binder material having a glass transition temperature (Tg).

15. The method of claim 14, wherein applying conductive heat comprises applying heat at a temperature within 20° C. of the glass transition temperature (Tg) according to dynamic mechanical analysis.

16. The method of claim 1, comprising:
clamping the slab in a first curved configuration for a first period of time while heat is simultaneously applied to the first and second major surfaces to form a first curve having a first radius of curvature; and
clamping the slab in a second curved configuration for a second period of time while heat is simultaneously applied to the first and second major surfaces to form a second curve having a second radius of curvature.

17. A method of thermoforming a slab, comprising:
applying conductive heat simultaneously to a first major surface and a second major surface of a slab comprising particulate material, the first major surface separated from the second major surface by a slab thickness; and
forming the slab to a mold while applying the conductive heat to the first and second major surfaces by heating a first conductive pad positioned on the first major surface of the slab and heating a second conductive pad positioned on the second major surface of the slab;
wherein the resulting slab includes a curve having a minimum radius of curvature between 18 inches and 100 inches.

18. The method of claim 17, wherein the slab comprises a particulate material, one or more pigments, and one or more resin binders, and applying conductive heat comprises applying heat at a temperature within 20° C. of a glass transition temperature (Tg) according to dynamic mechanical analysis of the one or more resin binders.

19. The method of claim 17, wherein the slab comprises a particulate material, one or more pigments, and one or more resin binders, and applying conductive heat comprises applying heat at a temperature at or within 20° C. above a Vicat softening point temperature of the one or more resin binders.

20. The method of claim 17, wherein the slab comprises a particulate material, one or more pigments, and one or more resin binders, and applying conductive heat comprises applying heat at a temperature at or within 20° C. above a heat distortion temperature (HDT) of the one or more resin binders.

* * * * *